US012206195B2

(12) United States Patent
Tanaka et al.

(10) Patent No.: US 12,206,195 B2
(45) Date of Patent: Jan. 21, 2025

(54) ELECTRIC WIRE TERMINAL RETAINED WITHIN A CONNECTOR HOUSING AND METHOD OF MANUFACTURE THEREOF

(71) Applicant: Yazaki Corporation, Tokyo (JP)

(72) Inventors: Hiroyuki Tanaka, Kakegawa (JP); Yasuhiro Yamaguchi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 394 days.

(21) Appl. No.: 17/942,717

(22) Filed: Sep. 12, 2022

(65) Prior Publication Data

US 2023/0085368 A1 Mar. 16, 2023

(30) Foreign Application Priority Data

Sep. 15, 2021 (JP) ................................ 2021-150396

(51) Int. Cl.
*H01R 13/42* (2006.01)
*H01R 4/02* (2006.01)
*H01R 43/02* (2006.01)
*H01R 43/20* (2006.01)

(52) U.S. Cl.
CPC ............ *H01R 13/42* (2013.01); *H01R 4/023* (2013.01); *H01R 43/0214* (2013.01); *H01R 43/0263* (2013.01); *H01R 43/20* (2013.01)

(58) Field of Classification Search
CPC .... H01R 13/42; H01R 4/023; H01R 43/0214; H01R 43/0263; H01R 43/20
See application file for complete search history.

(56) References Cited

U.S. PATENT DOCUMENTS

| | | | | |
|---|---|---|---|---|
| 8,585,421 | B2 * | 11/2013 | Yamaguchi ............ | H01R 13/05 439/248 |
| 9,325,095 | B2 * | 4/2016 | Glick .................. | H01R 13/187 |
| 9,843,131 | B2 * | 12/2017 | Kim .................... | H01R 13/625 |
| 10,008,800 | B2 * | 6/2018 | Inoue .................... | H01R 13/42 |

FOREIGN PATENT DOCUMENTS

| | | |
|---|---|---|
| JP | 2012-234635 A | 11/2012 |
| JP | 2016-134224 A | 7/2016 |

* cited by examiner

*Primary Examiner* — Vanessa Girardi
(74) *Attorney, Agent, or Firm* — Sughrue Mion, PLLC

(57) ABSTRACT

A connector includes a terminal, an electric wire, and a housing having a tubular portion that accommodates the terminal and the electric wire therein. An electric wire connection portion and a terminal connection portion are provided on both end sides of the terminal. The electric wire connection portion is connected to the electric wire. A joining portion between an end surface of the electric wire connection portion and an end surface of the electric wire includes a protruding piece protruding in a radial direction of the electric wire connection portion. A first retaining piece and a second retaining piece configured to be locked to the protruding piece are provided on an inner peripheral surface of the tubular portion. The second retaining piece is disposed at a position shifted from the first retaining piece in both a circumferential direction and an axial direction of the tubular portion.

6 Claims, 10 Drawing Sheets

ELECTRIC WIRE TERMINAL RETAINED WITHIN A CONNECTOR HOUSING AND METHOD OF MANUFACTURE THEREOF

CROSS-REFERENCE TO RELATED APPLICATIONS

This application is based on and claims priority under 35 USC 119 from Japanese Patent Application No. 2021-150396 filed on Sep. 15, 2021, the contents of which are incorporated herein by reference.

TECHNICAL FIELD

The present disclosure relates to a connector and a method for manufacturing the connector.

BACKGROUND ART

As a connector using a terminal having a cylindrical electrical connection portion, there is a connector described in JP-A-2016-134224. The connector includes a connector housing and a terminal. The terminal is formed in a cylindrical shape and has a terminal protruding portion provided so as to protrude from an outer surface of the connector. The connector housing includes a terminal insertion hole that is formed in a cylindrical shape and into which the terminal can be inserted, and a locking recessed portion into which the terminal protruding portion is fitted and locked in a state where the terminal is inserted into the terminal insertion hole. In addition, the connector housing includes a pair of rotation restricting wall surfaces that abut on the terminal protruding portion and restrict rotation of the terminal toward both sides in a circumferential direction of the terminal, in a state where the terminal protruding portion is fitted and locked to the locking recessed portion. The rotation restricting wall surfaces are formed on surfaces of a pair of protruding wall bodies of the connector housing which serve as front ends. The connector housing is formed by resin molding. The protruding wall bodies are final filling positions of the resin. According to the connector, the terminal protruding portion and the pair of rotation restricting wall surfaces abut on each other in a state where the terminal protruding portion is fitted and locked to the locking recessed portion, such that it is possible to restrict the rotation of the terminal toward both sides in the circumferential direction, and thus it is possible to prevent looseness of the terminal in the circumferential direction.

In the terminal of the connector, the electrical connection portion includes a cylindrical portion and an elastic contact spring that is disposed inside the cylindrical portion and is formed in a band shape along an insertion direction of the terminal, and a mating terminal is sandwiched between the elastic contact spring and an inner peripheral surface of the cylindrical portion. The electrical connection portion has a spring contact point formed to protrude from the elastic contact spring, and the terminal protruding portion is disposed directly below the spring contact point.

However, when a terminal housing and the spring contact point have an integrated structure, the terminal protruding portion cannot be disposed directly below the spring contact point, and a size of the terminal increases. In addition, since it is necessary to form the terminal protruding portion on the terminal, a manufacturing cost of the terminal is increased.

SUMMARY OF INVENTION

The present disclosure has been made in view of the above circumstances, and an object of the present disclosure is to provide a connector and a method for manufacturing the connector capable of reducing a size of a terminal and manufacturing the connector at a low cost.

In order to achieve the above object, an aspect of non-limiting embodiments of the present disclosure relates to provide a connector including:

a terminal;

an electric wire connected to the terminal; and a housing having a tubular portion that accommodates and holds the terminal and the electric wire therein, in which an electric wire connection portion and a terminal connection portion are provided on both end sides of the terminal, the electric wire connection portion is connected to the electric wire, the terminal connection portion is configured to be connected to a mating terminal, the electric wire connection portion is formed in a solid cylindrical shape, a joining portion between an end surface of the electric wire connection portion and an end surface of the electric wire includes a protruding piece protruding in a radial direction of the electric wire connection portion, a first retaining piece and a second retaining piece configured to be locked to the protruding piece are provided on an inner peripheral surface of the tubular portion of the housing, and the second retaining piece is disposed at a position shifted from the first retaining piece in both a circumferential direction and an axial direction of the tubular portion.

In addition, in order to achieve the above object, according to an aspect of the present disclosure, there is provided a method for manufacturing the above connector, including:

inserting the terminal connection portion of the terminal into the tubular portion of the housing to abut the protruding piece against the first retaining piece; and rotating the terminal in the tubular portion in the circumferential direction to position the protruding piece between the first retaining piece and the second retaining piece.

According to the connector and the method for manufacturing the connector of the present disclosure, it is possible to reduce a size of a terminal and to manufacture the connector at a low cost.

The present disclosure has been briefly described above. Details of the present disclosure will be further clarified by reading through modes for carrying out the present disclosure described below (hereinafter, referred to as "embodiments") with reference to the accompanying drawings.

DESCRIPTION OF EMBODIMENTS

A specific embodiment of the present disclosure will be described below with reference to the drawings.

First Embodiment

Figure 1:
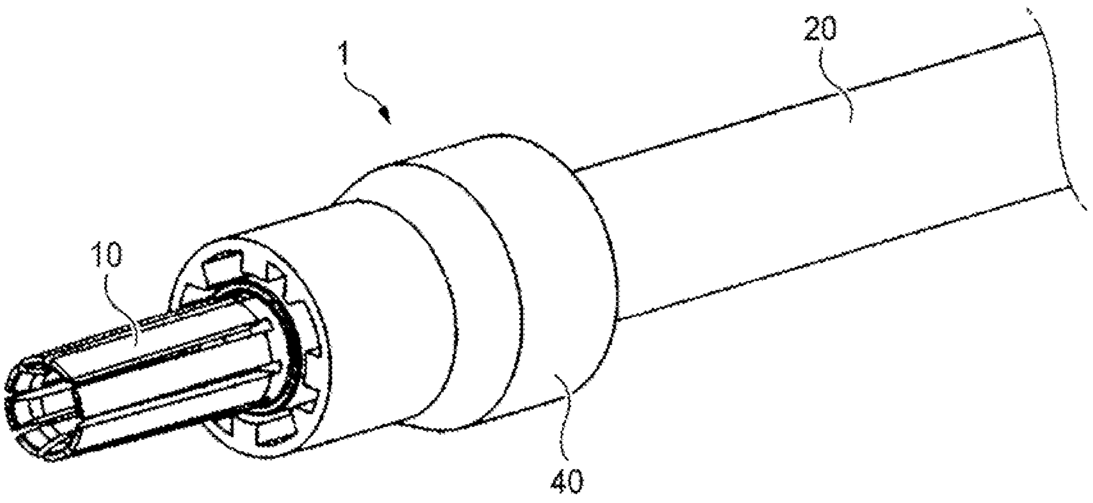
FIG. 1 is a perspective view of a connector according to a first embodiment.
Figure 2:
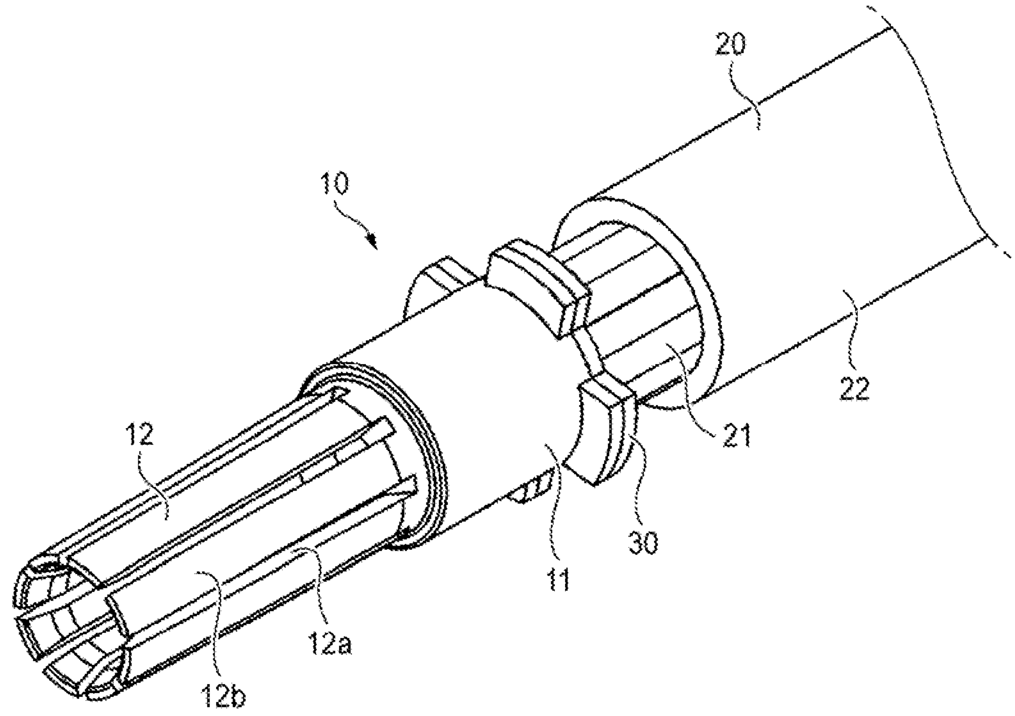
FIG. 2 is a perspective view of a terminal shown in FIG. 1.
Figure 3:
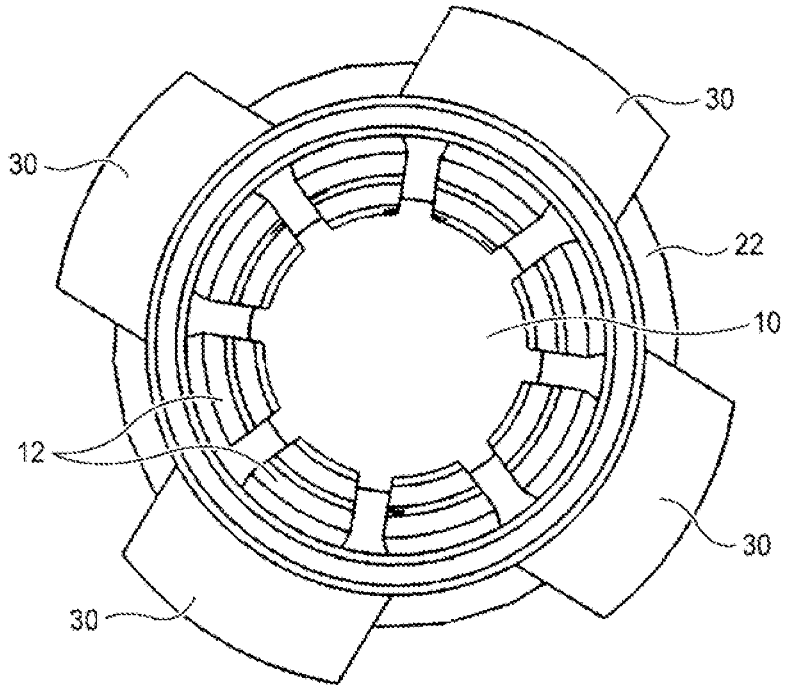
FIG. 3 is a front view of the terminal shown in FIG. 2.
Figure 4:
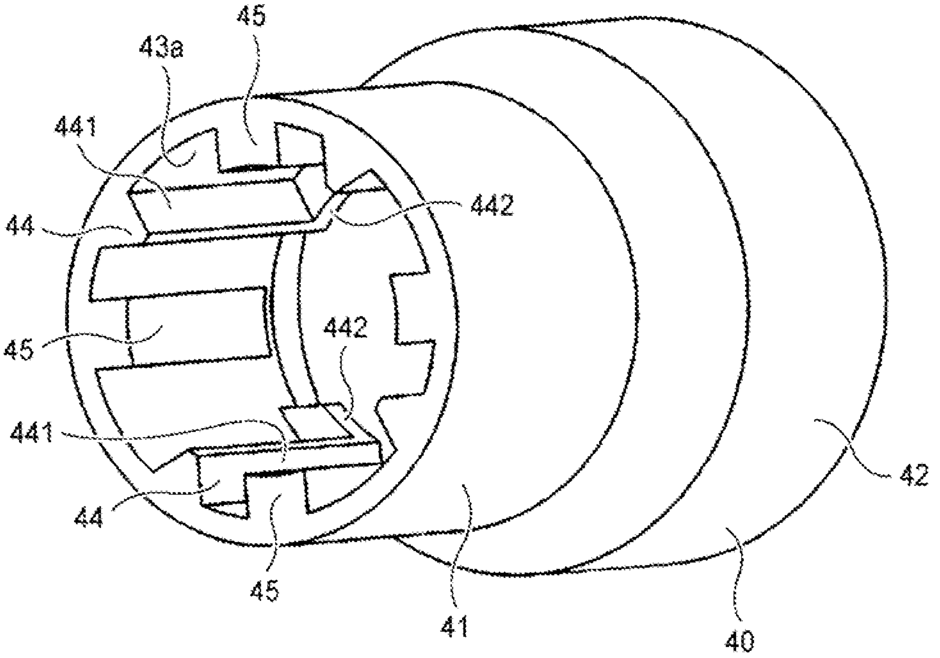
FIG. 4 is a perspective view of a housing shown in FIG. 1.
Figure 5:
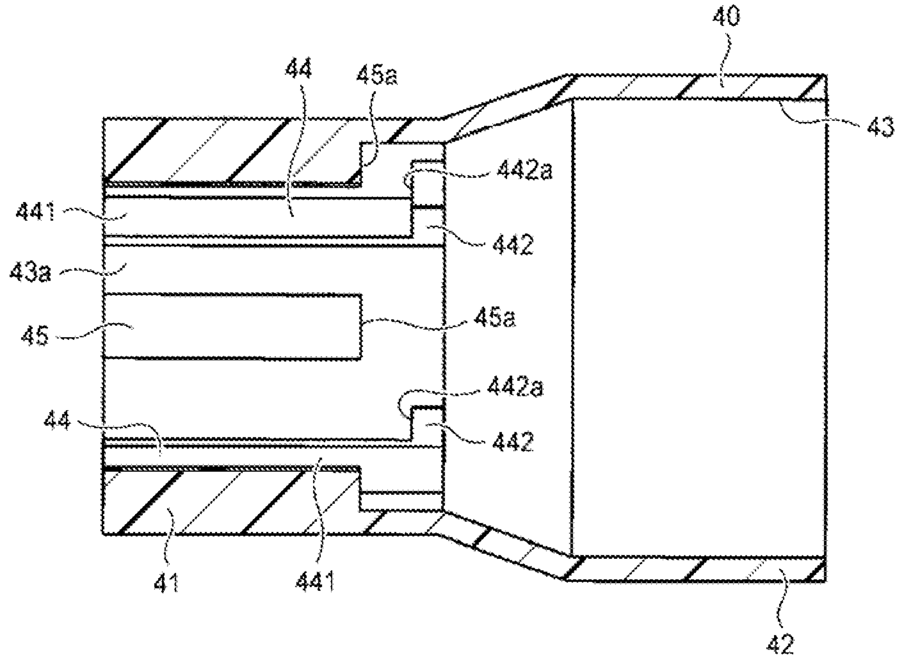
FIG. 5 is a cross-sectional view of the housing shown in FIG. 5.

FIG. 1 is a perspective view of a connector 1 according to a first embodiment. FIGS. 2 and 3 are respectively a perspective view and a front view of a terminal 10 shown in FIG. 1. FIGS. 4 and 5 are respectively a perspective view and a cross-sectional view of a housing 40 shown in FIG. 1.

As shown in FIG. 1, the connector 1 includes the terminal 10, an electric wire 20, and the housing 40. The electric wire 20 is connected to the terminal 10. The housing 40 accommodates and holds the terminal 10 and the electric wire 20 in an internal tubular portion 43 of the hosing 40 (see FIG. 5). As an example, the connector 1 is used as a charging inlet of an electric vehicle and the like.

As shown in FIG. 2, the terminal 10 is a metal female terminal including an electric wire connection portion 11 to be connected to the electric wire 20 and a terminal connection portion 12 to be connected to a mating terminal (not shown). The electric wire connection portion 11 and the terminal connection portion 12 are provided on both end sides of the terminal 10 respectively.

The electric wire connection portion 11 is formed in a solid columnar shape. In the present embodiment, the electric wire connection portion 11 is formed in a solid cylindrical shape, and the electric wire connection portion 11 may be formed in a solid columnar shape and may have a length capable of forming a protruding piece 30 to be described later on the end portion of the electric wire connection portion 11, and may have a prismatic shape and the like.

A plurality of slits 12*a* and a plurality of elastic contact pieces 12*b* are alternately disposed on a circumference of the terminal connection portion 12. The terminal connection portion 12 has a substantially cylindrical shape with a long dimension, and the mating terminal is inserted into the terminal connection portion 12.

The electric wire 20 includes a conductor 21 made of copper or aluminum and an insulator 22 covering an outer periphery of the conductor 21, and the conductor 21 is exposed from the insulator 22 at an end portion of the electric wire 20. The electric wire 20 includes the conductor 21 in which a plurality of strands are straightly arranged without being twisted together. In the present embodiment, an example in which the electric wire 20 is a covered electric wire is shown, and the type of the electric wire 20 is not limited thereto. For example, the conductor 21 may be a single wire or a twisted pair wire in which a plurality of strands are twisted together, or the conductor 21 may not be covered with the insulator 22.

As shown in FIG. 3, a joining portion between an end surface of the electric wire connection portion 11 and an end surface of the electric wire 20 has four protruding pieces 30 protruding in a radial direction of the terminal 10. The four protruding pieces 30 have a shape obtained by partially removing portions from an annular flange at equal intervals.

As shown in FIGS. 4 and 5, the housing 40 is formed of a synthetic resin material and has a substantially hollow cylindrical shape, and includes a terminal accommodating portion 41 for accommodating the terminal 10 on a front side (left side in FIG. 5) and an electric wire accommodating portion 42 for accommodating the electric wire 20 on a rear side (right side in FIG. 5). The tubular portion 43 of the housing 40 passes through the terminal accommodating portion 41 and the electric wire accommodating portion 42 in a front-rear direction of the housing 40.

Four ribs 44 and four ribs 45 as second retaining pieces to be locked to the protruding pieces 30 are provided on an inner peripheral surface 43*a* of the tubular portion 43 of the terminal accommodating portion 41. Each of insertion holes is formed between the ribs 44 adjacent to each other. Each of the insertion holes conforms to a shape of each of the protruding pieces 30.

Each of the ribs 44 includes a prismatic rotation stop portion 441 extending from a front end of the housing 40 along an axial direction (front-rear direction) of the tubular portion 43, and a first retaining piece 442 connected to a rear end of the rotation stop portion 441 and extending in a circumferential direction of the tubular portion 43.

Each of the ribs 45 has a substantially prismatic shape extending from the front end of the housing 40 along the axial direction of the housing 40. The ribs 45 are disposed at positions shifted from the first retaining piece 442 in the circumferential direction and the axial direction of the tubular portion 43. The ribs 45 and the ribs 44 are alternately disposed in the circumferential direction on the inner peripheral surface 43*a* of the tubular portion 43. As shown in FIG. 5, each of the ribs 45 has a length in the axial direction shorter than that of each of the ribs 44. On the inner peripheral surface 43*a*, a rear end surface 45*a* of each of the ribs 45 and a front end surface 442*a* of each of the first retaining pieces 442 are shifted from each other in the axial direction. The terminal 10 and the electric wire 20 are held in the housing 40 in a state where each of the protruding pieces 30 is sandwiched between the rear end surface 45*a* of each of the ribs 45 and the front end surface 442*a* of each of the first retaining pieces 442. Since each of the protruding pieces 30 is sandwiched between each of the ribs 44 and each of the ribs 45 in this manner, the terminal 10 is prevented from coming off from the housing 40.

The electric wire accommodating portion 42 accommodates the electric wire 20 in the tubular portion 43, in a state where the terminal 10 having an end surface to which the electric wire 20 is joined is inserted from the rear of the housing 40 and held in the terminal accommodating portion 41.

Figure 6:
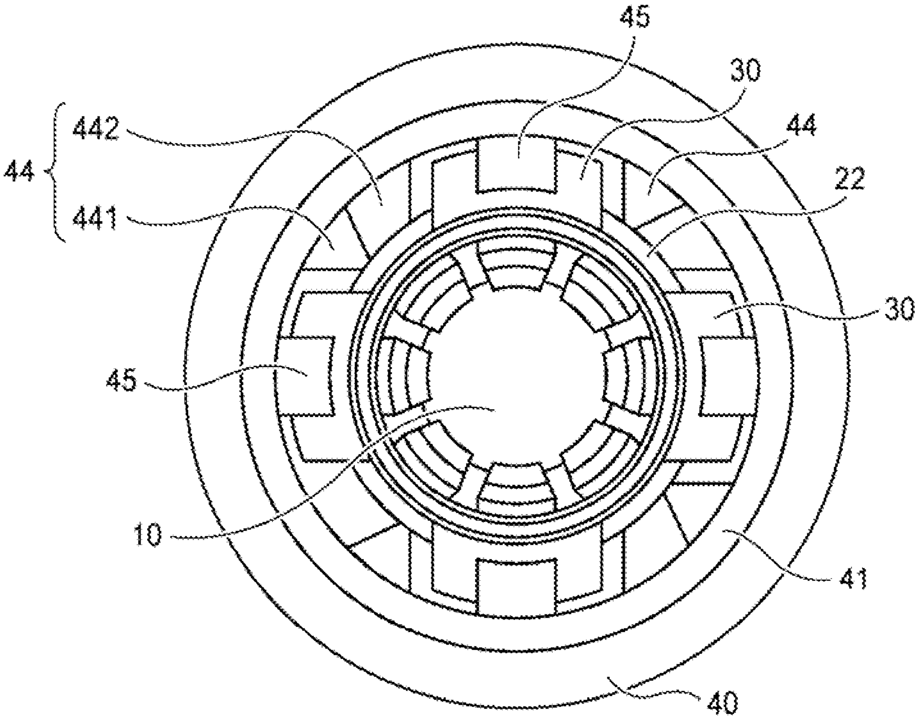
FIG. 6 is a front view showing the terminal and the housing before fitting.
Figure 7:
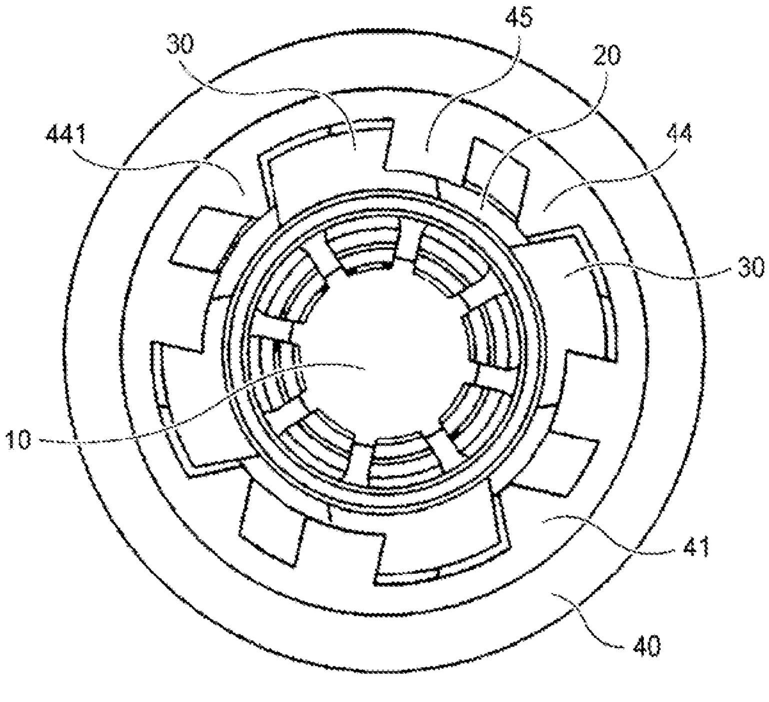
FIG. 7 is a front view showing the terminal and the housing after fitting.
Figure 8:
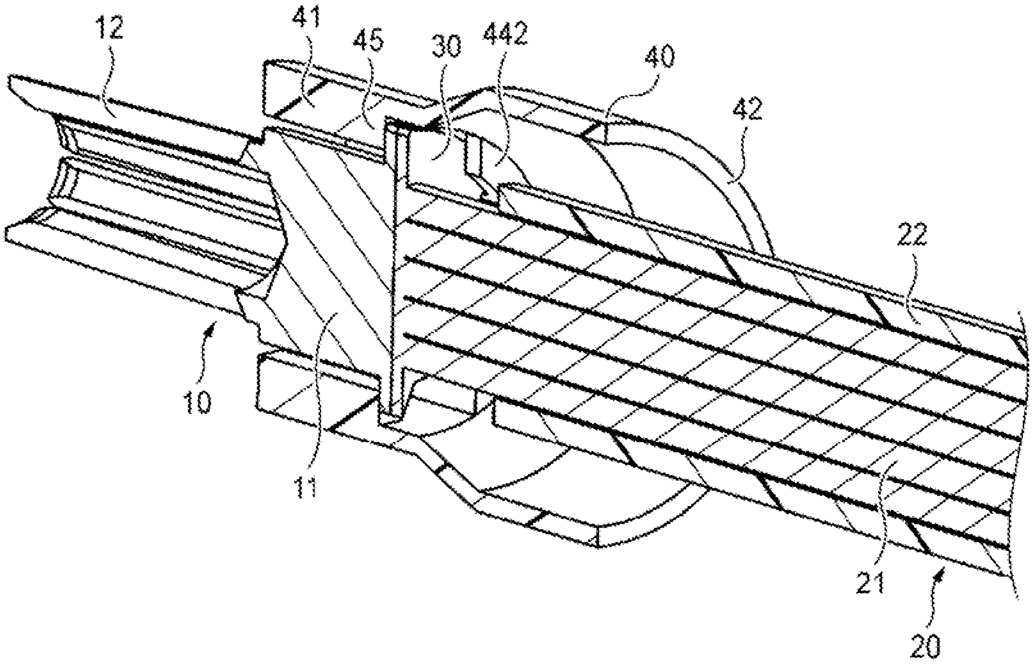
FIG. 8 is a cross-sectional view showing the terminal and the housing after fitting.

A method for fitting the terminal 10 into the housing 40, that is, a method for manufacturing the connector 1 will be described with reference to FIGS. 6 to 8. FIG. 6 is a front view showing the terminal 10 and the housing 40 before fitting. FIG. 7 is a front view showing the terminal 10 and the housing 40 after fitting. FIG. 8 is a cross-sectional view showing the terminal 10 and the housing 40 after fitting. The terminal 10 and the electric wire 20 are joined in advance by a method to be described later, and the protruding piece 30 is formed on a joining portion.

As shown in FIG. 6, the terminal 10 joined to the electric wire 20 is inserted from the rear of the housing 40 to a position (abutting position) at which each of the protruding pieces 30 passes between the first retaining pieces 442 adjacent to each other and each of the protruding pieces 30 abuts against the rear end surface 45*a* (see FIG. 5) of each of the ribs 45. That is, each of the protruding pieces 30 abuts against the first retaining piece 442 of each of the ribs 44. Next, in a state where the terminal 10 is inserted to the abutting position, as shown in FIGS. 7 and 8, the terminal 10 is rotated in the tubular portion 43 in the circumferential direction to position each of the protruding pieces 30 between the corresponding first retaining piece 442 and the corresponding rib 45. At this time, the terminal 10 is rotationally moved in the tubular portion 43 to a position where each of the protruding pieces 30 abuts on the rotation stop portion 441. Accordingly, since the rotation stop portion 441 restricts the rotational movement of each of the protruding pieces 30 in the circumferential direction, each of the protruding pieces 30 can be reliably held between the corresponding first retaining piece 442 and the corresponding rib 45, and the terminal 10 can be reliably prevented from coming off from the housing 40.

Figure 9:
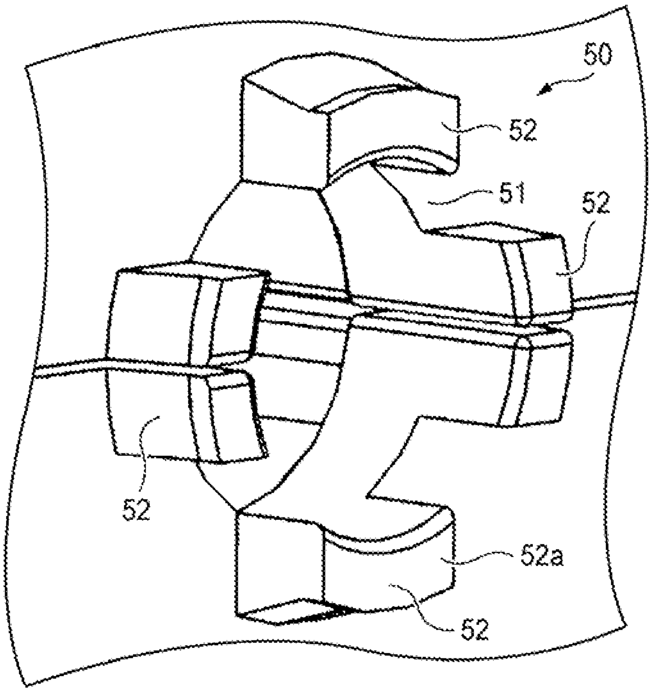
FIG. 9 is a perspective view of a first electrode according to the first embodiment.
Figure 10:
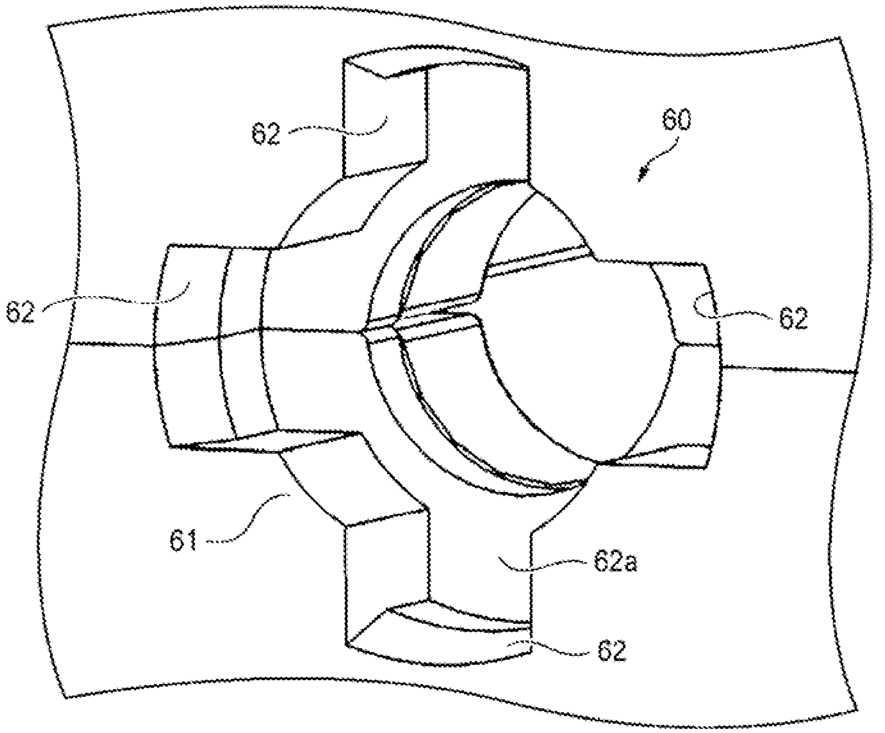
FIG. 10 is a perspective view of a second electrode according to the first embodiment.
Figure 11:
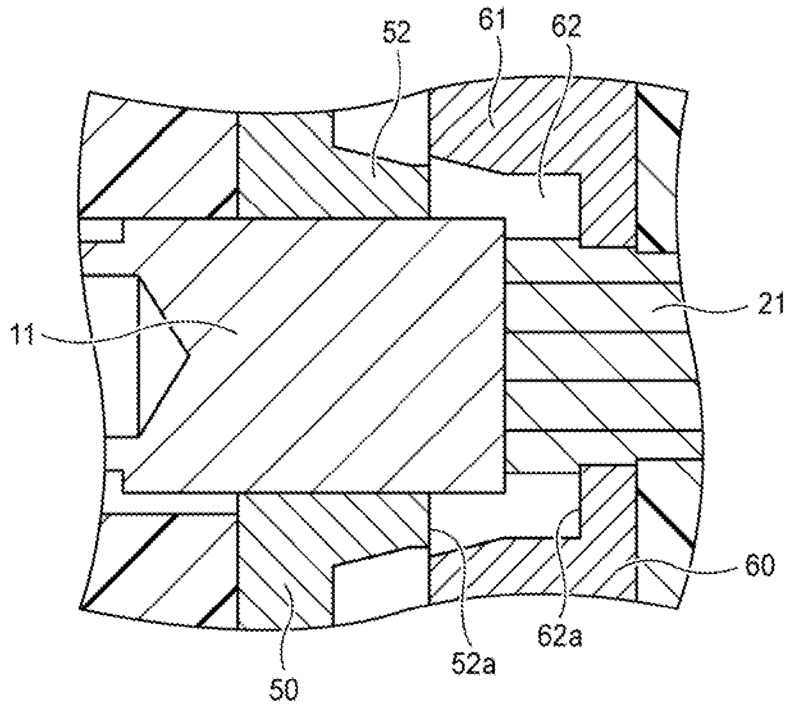
FIG. 11 is a cross-sectional view showing a state before a terminal and an electric wire are joined by a first electrode and a second electrode.
Figure 12:
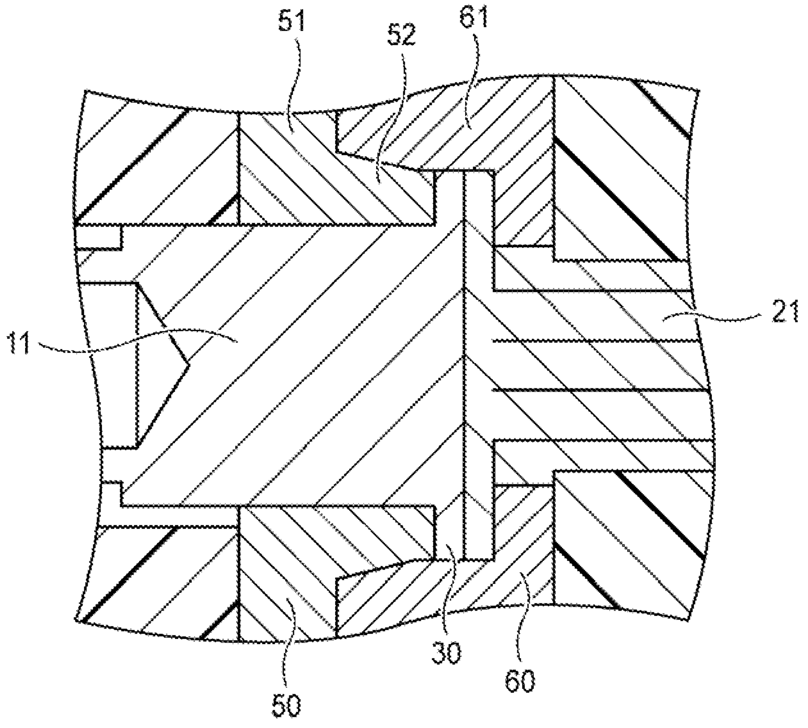
FIG. 12 is a cross-sectional view showing a state after the terminal and the electric wire are joined by the first electrode and the second electrode.

Next, a method for forming the protruding piece 30 at the joining portion between the terminal 10 and the electric wire 20 described above will be described with reference to FIGS. 9 to 12. FIGS. 9 and 10 are perspective views of a first electrode 50 and a second electrode 60 according to the first embodiment. FIG. 11 is a cross-sectional view showing a state before the terminal 10 and the electric wire 20 are joined by the first electrode 50 and the second electrode 60. FIG. 12 is a cross-sectional view showing a state after the terminal 10 and the electric wire 20 are joined by the first electrode 50 and the second electrode 60.

The joining portion between the terminal 10 and the electric wire 20 is formed by disposing the end surface of the electric wire connection portion 11 and the end surface of the electric wire 20 so as to abut on each other between the first electrode 50 and the second electrode 60 capable of being fitted to the first electrode 50, and thermally pressure-welding the end surface of the electric wire connection portion 11 and the end surface of the electric wire 20.

As shown in FIG. 9, the first electrode 50 includes a first electrode body 51 covering a periphery of the electric wire connection portion 11, and a plurality of projection portions 52 protruding from the first electrode body 51 toward the second electrode 60. The first electrode body 51 is a block having a cylindrical terminal accommodating space therein, and surfaces on which the projection portions 52 are provided are flat surfaces.

As shown in FIG. 10, the second electrode 60 includes a second electrode body 61 covering an end portion of the electric wire 20, and recessed portions 62 provided in the second electrode body 61 and capable of accommodating the projection portions 52 respectively. The second electrode body 61 is a block having a cylindrical electric wire accommodating space therein, and surfaces on which the recessed portions 62 are provided are flat surfaces.

In the present embodiment, four projection portions 52 and four recessed portions 62 are provided. Each of the first electrode 50 and the second electrode 60 is configured to be vertically divisible into two, and the terminal 10 and the electric wire 20 can be easily disposed in the first electrode 50 and the second electrode 60 in a state where the first electrode 50 and the second electrode 60 are vertically opened.

In a state where the first electrode body 51 and the second electrode body 61 abut on each other (see FIG. 12), the projection portions 52 and the recessed portions 62 are formed in size and shape having gaps (electrode spaces) between a front end surface 52*a* of each of the projection portions 52 in a protruding direction of the projection portions 52 and a bottom surface 62*a* of each of the recessed portions 62. The gaps correspond to size and shape of the protruding pieces 30.

As shown in FIG. 11, the terminal 10 and the electric wire 20 are disposed between the first electrode 50 and the second electrode 60 in a state where the end surface of the electric wire connection portion 11 and the end surface of the conductor 21 abut against each other, and a pressure is applied to an abutting surface between the electric wire connection portion 11 and the conductor 21. In this state, when the first electrode 50 and the second electrode 60 are energized, the end surface of the electric wire connection portion 11 and the end surface of the conductor 21 are heated by Joule heat generated in a contact resistance of an abutted portion between the electric wire connection portion 11 and the conductor 21. When the heated electric wire connection portion 11 and the conductor 21 (electric wire 20) are pressurized, as shown in FIG. 12, the joining portion between the electric wire connection portion 11 and the conductor 21 is pressed and expanded into the electrode spaces, and the protruding pieces 30 are formed. The thermal pressure welding between the terminal 10 and the electric wire 20 is performed under appropriate pressure conditions and temperature conditions.

As described above, the protruding pieces 30 are enlarged portions formed when the end surface of the electric wire 20 (conductor 21) and the end surface of the terminal 10 (electric wire connection portion 11) are joined by thermal pressure welding (heating pressure welding).

Accordingly, by forming the protruding pieces 30 during the joining of the terminal 10 and the electric wire 20, it is not necessary to separately form protrusions on the terminal 10, and thus the terminal 10 can be manufactured at a low cost. In addition, by using burrs (protrusions) formed during thermal pressure welding as the protruding pieces 30, a step of removing the burrs, which are required after normal thermal pressure welding, can be reduced.

As described above, according to the connector 1 of the first embodiment, the joining portion between the electric wire 20 and the terminal 10 includes the protruding pieces 30 protruding in the radial direction, and the terminal 10 and the electric wire 20 are held in the housing 40 in a state where the protruding pieces 30 are sandwiched between the first retaining pieces 442 and the ribs 45 (second retaining pieces) respectively. That is, the connector 1 can prevent the terminal 10 from coming off from the housing 40 by using the joining portion between the electric wire 20 and the terminal 10. Therefore, a size can be reduced as compared with a case where a protrusion for locking to the housing is separately formed. In addition, since the protruding pieces 30 are formed during the joining of the terminal 10 and the electric wire 20, the terminal 10 can be manufactured at a cost lower than in a case where protruding pieces (protrusions) are separately formed on the terminal 10.

Second Embodiment

In the first embodiment, an example in which the joining portion between the terminal 10 and the electric wire 20 has four protruding pieces 30 has been described, and the shape and the number of the protruding pieces are not limited to those in the first embodiment. Hereinafter, with reference to FIGS. 13 to 19, an example of a connector 1A including protruding pieces 30A having a shape and a number different from those of the protruding pieces 30 will be described.

Figure 13:
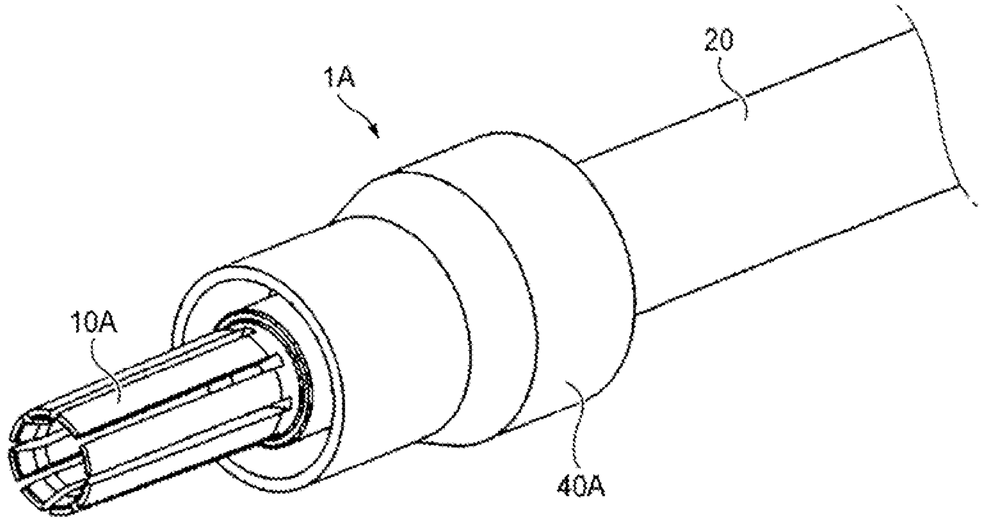
FIG. 13 is a perspective view of a connector according to a second embodiment.
Figure 14:
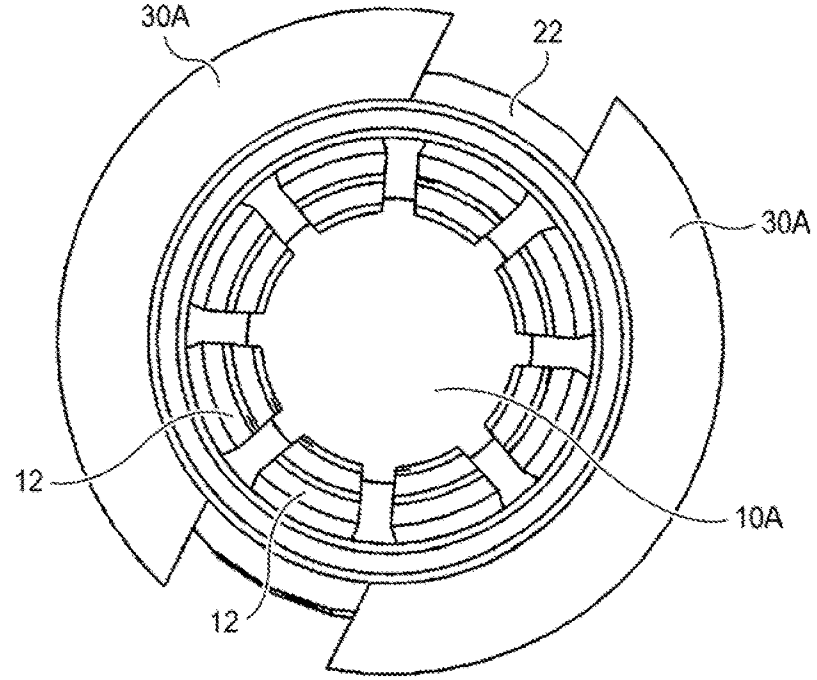
FIG. 14 is a front view of a terminal shown in FIG. 13.
Figure 15:
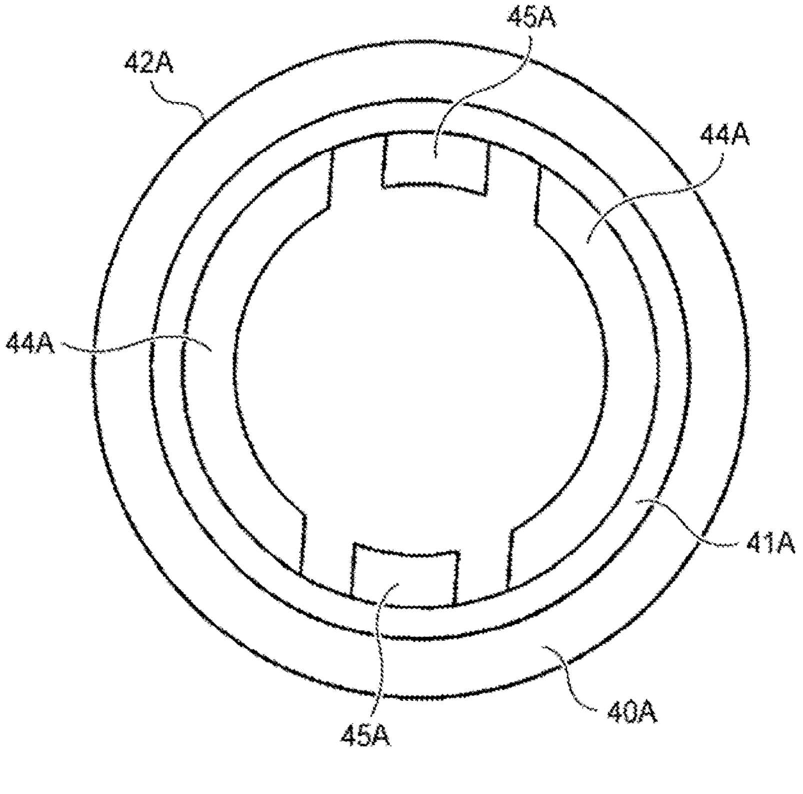
FIG. 15 is a front view of a housing shown in FIG. 13.
Figure 16:
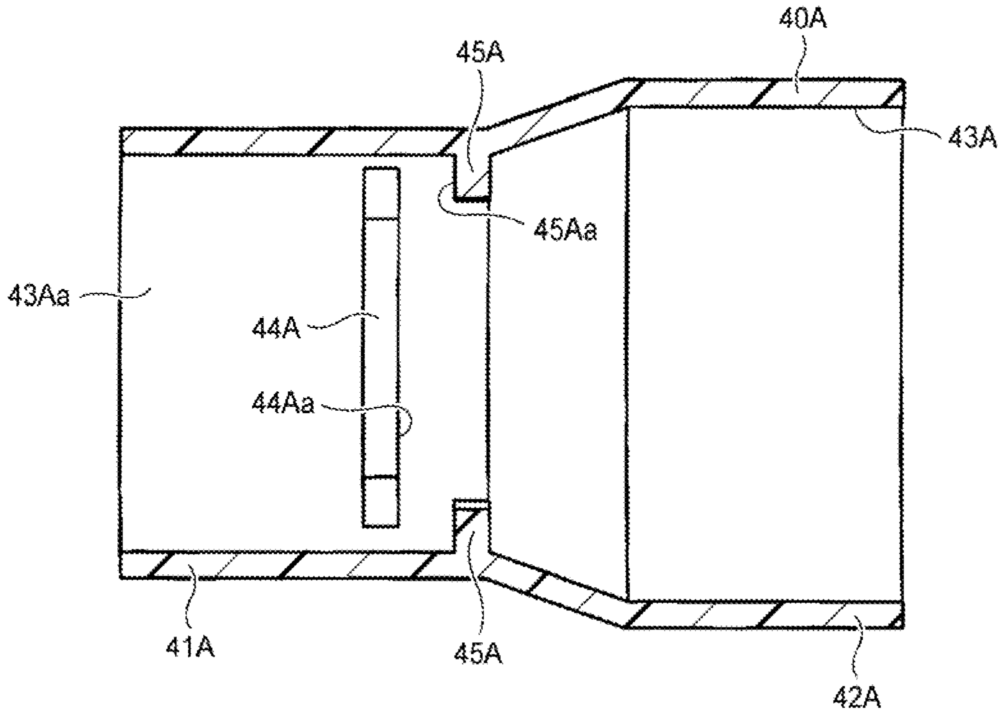
FIG. 16 is a cross-sectional view of the housing shown in FIG. 15.
Figure 17:
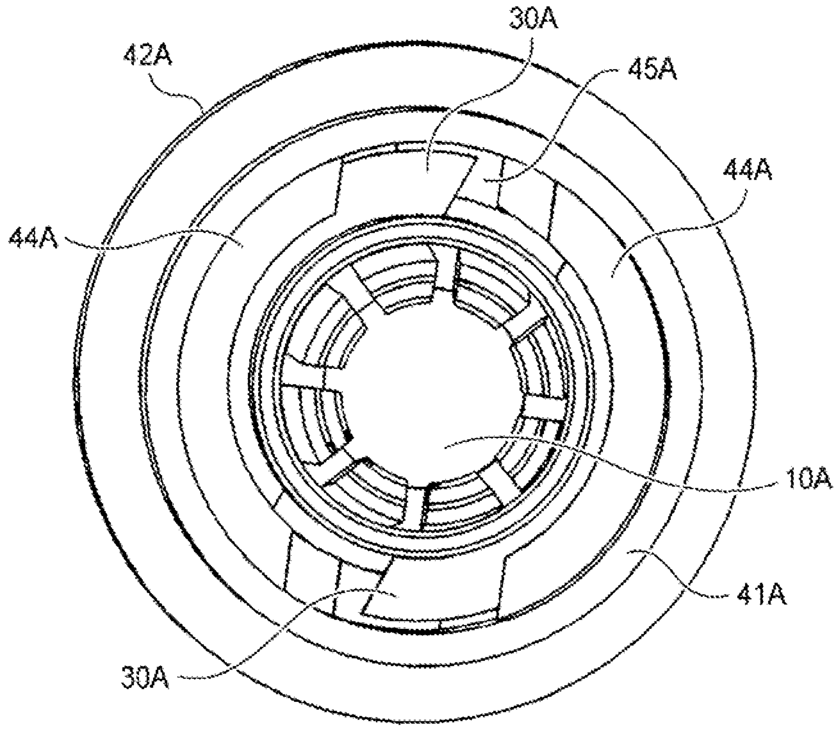
FIG. 17 is a front view showing the terminal and the housing after fitting.

FIG. 13 is a perspective view of the connector 1A according to a second embodiment. FIG. 14 is a front view of a terminal 10A shown in FIG. 13. FIGS. 15 and 16 are respectively a front view and a cross-sectional view of a housing 40A shown in FIG. 13. FIG. 17 is a front view showing the terminal 10A and the housing 40A after fitting. In the second embodiment, members and portions that are the same as or equivalent to the members and portions shown in FIGS. 1 to 12 are denoted by the same or equivalent reference numerals, and a repetitive description thereof will be omitted.

As shown in FIG. 14, in the connector 1A according to the second embodiment, a joining portion between the terminal 10A and the electric wire 20 includes two protruding pieces 30A. Each of the two protruding pieces 30A has a shape obtained by partially removing portions from an annular flange at two positions facing each other in a radial direction of the terminal 10A.

As shown in FIGS. 15 and 16, in the housing 40A according to the second embodiment, two ribs 44A as the first retaining pieces and two ribs 45A as the second retaining pieces to be locked to the protruding pieces 30A are provided on an inner peripheral surface 43Aa of a tubular portion 43A of a terminal accommodating portion 41A. In the housing 40A, each of insertion holes conforming to the shape of each of the protruding pieces 30A is formed between the ribs 45A provided at two positions facing each other in the radial direction.

The ribs 44A are U-shaped ribs extending along a circumferential direction of the tubular portion 43A, and the ribs 45A are short ribs extending along the circumferential direction of the tubular portion 43A. The ribs 45A are disposed at positions shifted from the ribs 44A in the circumferential direction and an axial direction of the tubular portion 43A. The ribs 45A and the ribs 44A are alternately disposed in the circumferential direction on the inner peripheral surface 43Aa of the tubular portion 43A. The ribs 45A are disposed rearward of the ribs 44A, and rear end surfaces 44Aa of the ribs 44A and front end surfaces 45Aa of the ribs 45A are shifted from each other in the axial direction. The terminal 10A and the electric wire 20 are held in the housing 40A in a state where each of the protruding pieces 30A is sandwiched between the rear end surface 44Aa of each of the ribs 44A and the front end surface 45Aa of each of the ribs 45A.

When the connector 1A is manufactured, the terminal 10A joined to the electric wire 20 is inserted from the rear of the housing 40A such that the ribs 45A pass through gaps between the protruding pieces 30A, and is inserted to a position (abutting position) where each of the protruding pieces 30A abuts against the rear end surface 44Aa (see FIG. 16) of each of the ribs 44A. Next, in a state where the terminal 10A is inserted to the abutting position, the terminal 10A is rotated in the circumferential direction in the tubular portion 43A, and the protruding pieces 30A are positioned between the ribs 44A and the ribs 45A respectively as shown in FIG. 17. Accordingly, in the connector 1A, since each of the protruding pieces 30A is sandwiched between the corresponding rib 44A and the corresponding rib 45A, the terminal 10A is prevented from coming off from the housing 40A.

Figure 18:
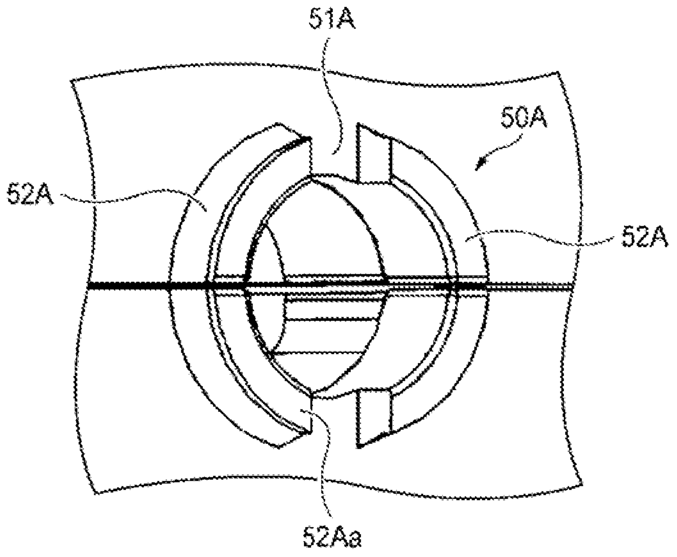
FIG. 18 is a perspective view of a first electrode according to the second embodiment.
Figure 19:
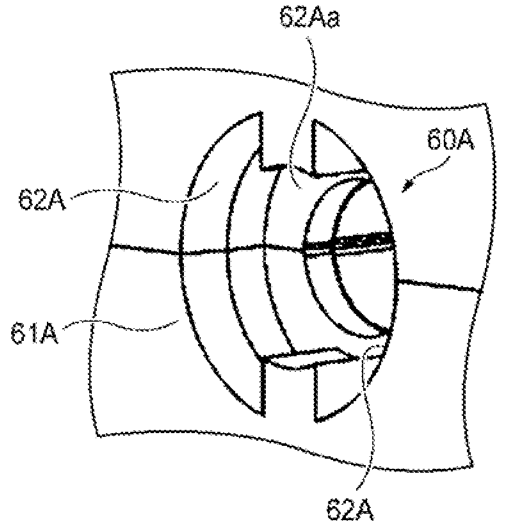
FIG. 19 is a perspective view of a second electrode according to the second embodiment.

Next, a method for forming the protruding pieces 30A at the joining portion between the terminal 10A and the electric wire 20 described above will be described with reference to FIGS. 18 and 19. FIGS. 18 and 19 are respectively perspective views of a first electrode 50A and a second electrode 60A according to the second embodiment.

The joining portion between the terminal 10A and the electric wire 20 is formed by disposing the end surface of the electric wire connection portion of the terminal 10A and the end surface of the electric wire 20 so as to abut on each other between the first electrode 50A and the second electrode 60A capable of being fitted to the first electrode 50A, and thermally pressure-welding the end surface of the electric wire connection portion of the terminal 10A and the end surface of the electric wire 20.

As shown in FIG. 18, the first electrode 50A includes a first electrode body 51A covering a periphery of the electric wire connection portion of the terminal 10A, and a plurality of projection portions 52A protruding from the first electrode body 51A toward the second electrode 60A. The first electrode body 51A is a block having a cylindrical terminal accommodating space therein, and surfaces on which the projection portions 52A are provided are flat surfaces.

As shown in FIG. 19, the second electrode 60A includes a second electrode body 61A covering the end portion of the electric wire 20, and recessed portions 62A provided in the 1*l* second electrode body 61A and capable of accommodating the projection portions 52A. The second electrode body 61A is a block having a cylindrical electric wire accommodating space therein, and surfaces on which the recessed portions 62A are provided are flat surfaces.

In the present embodiment, two projection portions 52A and two recessed portions 62A are provided.

In a state where the first electrode body 51A and the second electrode body 61A abut on each other, the projection portions 52A and the recessed portions 62A are formed in size and shape having gaps (electrode spaces) between a front end surface 52Aa of each of the projection portions 52A in the protruding direction of the projection portion 52A and a bottom surface 62Aa of each of the recessed portions 62A. The gaps correspond to size and shape of the protruding pieces 30A.

The terminal 10A and the electric wire 20 are disposed between the first electrode 50A and the second electrode 60A in a state where the end surface of the electric wire connection portion of the terminal 10A and the end surface of the conductor 21 abut against each other, and a pressure is applied to an abutting surface between the electric wire connection portion 11 and the conductor 21. In this state, when the first electrode 50A and the second electrode 60A are energized, the end surface of the electric wire connection portion and the end surface of the conductor 21 are heated by Joule heat generated in a contact resistance of an abutted portion between the electric wire connection portion 11 and the conductor 21. When the heated electric wire connection portion and the conductor 21 (electric wire 20) are pressurized, the joining portion between the electric wire connection portion and the conductor 21 is pressed and expanded into the electrode spaces, and the protruding pieces 30A are formed. That is, the protruding piece 30A is an enlarged portion formed when the end surface of the electric wire 20 (conductor 21) and the end surface of the terminal 10 (electric wire connection portion 11) are joined by thermal pressure welding (heating pressure welding).

As described above, the connector 1A according to the second embodiment includes the protruding pieces 30A having the number and shape different from those of the protruding pieces 30 according to the first embodiment, and the terminal 10A and the electric wire 20 are held in the housing 40A in a state where the protruding pieces 30A are sandwiched between the ribs 44A and the ribs 45A. That is, similarly to the first embodiment, the connector 1A can prevent the terminal 10A from coming off from the housing 40A by using the joining portion between the electric wire 20 and the terminal 10A. Therefore, a size can be reduced as compared with a case where a protrusion for locking to the housing is separately formed. In addition, since the protruding pieces 30A are formed during the joining of the terminal 10A and the electric wire 20, the terminal 10A can be manufactured at a cost lower than in a case where protrusions are separately formed on the terminal 10A.

The present disclosure is not limited to the above-described embodiment, and modifications, improvements, and the like may be made as appropriate. In addition, materials, shapes, dimensions, numerical values, forms, numbers, arrangement locations, and the like of components according to the above-described embodiment can be set freely and are not limited as long as the present disclosure can be achieved. For example, in the connector 1A according to the second embodiment, an example in which the two protruding pieces 30A are provided on the joining portion between the electric wire 20 and the terminal 10A is shown, and only one protruding piece 30A may be provided. Since one protruding piece 30A is held in the housing in a state of being sandwiched between the rib 44A and the rib 45A, it is possible to prevent the protruding piece 30A from coming off from the housing, and it is possible to achieve the same effect as that of the second embodiment. In addition, a method for forming the protruding pieces 30, 30A is not limited to the above-described method, and for example, a plurality of strands may be formed into a single wire to form a round bar electric wire, and then the round bar electric wire may be abutted against the end surface of the terminal to be thermally pressure-welded. Further, a protrusion may be provided on the end surface of the terminal, and the terminal and the electric wire may be joined to each other by friction stir welding with the single-formed electric wire to form a protruding piece.

Here, features of the embodiment of the connector and the method for manufacturing the connector according to the present disclosure described above will be briefly summarized and listed in the following [1] to [6].

[1] A connector (1, 1A) including:

a terminal (10, 10A);

an electric wire (20) connected to the terminal; and a housing (40, 40A) having a tubular portion (43, 43A) that accommodates and holds the terminal and the electric wire therein, in which an electric wire connection portion (11) and a terminal connection portion (12) are provided on both end sides of the terminal (10, 10A), the electric wire connection portion (11) is connected to the electric wire, and the terminal connection portion (12) is configured to be connected to a mating terminal, the electric wire connection portion is formed in a solid cylindrical shape, a joining portion between an end surface of the electric wire connection portion and an end surface of the electric wire includes a protruding piece (30, 30A) protruding in a radial direction of the electric wire connection portion (11), a first retaining piece (442, rib 44A) and a second retaining piece (rib 45, 45A) configured to be locked to the protruding piece are provided on an inner peripheral surface (43*a*, 43Aa) of the tubular portion of the housing (40, 40A), and the second retaining piece is disposed at a position shifted from the first retaining piece in both a circumferential direction and an axial direction of the tubular portion.

According to the connector having the configuration of [1], the joining portion between the electric wire and the terminal includes the protruding piece protruding in the radial direction, and the terminal and the electric wire are held in the housing in a state where the protruding piece is sandwiched between the first retaining piece and the second retaining piece. That is, the connector can prevent the terminal from coming off from the housing by using the joining portion between the electric wire and the terminal. Therefore, a size can be reduced as compared with a case where a protrusion for locking to the housing is separately formed. In addition, since the protruding piece is formed during the joining of the terminal and the electric wire, the terminal can be manufactured at a cost lower than in a case where a protrusion is separately formed on the terminal.

[2] The connector according to [1], in which the terminal and the electric wire are held in the housing in a state where the protruding piece is sandwiched between the first retaining piece and the second retaining piece in the axial direction.

According to the connector having the configuration of [2], since the protruding piece is held in the housing in a state of being sandwiched between the first retaining piece and the second retaining piece in the axial direction, the terminal can be reliably prevented from coming off from the housing.

[3] The connector according to [1] or [2], in which the protruding piece is an enlarged portion formed when the end surface of the electric wire connection portion and the end surface of the electric wire are joined by thermal pressure welding.

According to the connector having the configuration of [3], the enlarged portion, which is formed when the terminal and the electric wire are joined by thermal pressure welding, can be used as the protruding piece. Therefore, a step of removing burrs (protrusions) formed during thermal pressure welding, which is necessary after the normal thermal pressure welding, can be reduced.

[4] The connector according to any one of [1] to [3], in which a rotation stop portion (441), which restricts rotational movement of the protruding piece in the circumferential direction, is provided on the inner peripheral surface of the tubular portion of the housing.

According to the connector having the configuration of [4], since the rotation stop portion restricts the rotational movement of the protruding piece in the circumferential direction, the protruding piece can be reliably held between the first retaining piece and the second retaining piece, and the terminal can be reliably prevented from coming off from the housing.

[5] A method for manufacturing the connector according to [1], including:

inserting the terminal connection portion of the terminal into the tubular portion of the housing to abut the protruding piece against the first retaining piece; and rotating the terminal in the tubular portion in the circumferential direction to position the protruding piece between the first retaining piece and the second retaining piece.

According to the method for manufacturing the connector having the configuration of [5], the connector having the configuration of [1] can be manufactured. Therefore, it is possible to reduce a size of the terminal and to manufacture the connector at a low cost.

[6] The method according to [5], in which the joining portion is formed by disposing the electric wire connection portion and the electric wire between a first electrode (50) and a second electrode (60) capable of being fitted to the first electrode in a state where the end surface of the electric wire connection portion and the end surface of the electric wire abut on each other, and by thermally pressure-welding the end surface of the electric wire connection portion and the end surface of the electric wire, the first electrode (50) includes a first electrode body (51) covering a periphery of the electric wire connection portion, and a projection portion (52) protruding from the first electrode body toward the second electrode, the second electrode (60) includes a second electrode body (61) covering an end portion of the electric wire, and a recessed portion (62) provided in the second electrode body and capable of accommodating the projection portion, in a state where the first electrode body and the second electrode body abut on each other, a gap is provided between a front end surface (52*a*) of the projection portion (52) in a protruding direction of the projection portion and a bottom surface (62*a*) of the recessed portion, and the protruding piece is formed by pressing and expanding an end portion of the electric wire connection portion and the end portion of the electric wire into the gap with the thermal pressure welding.

According to the method for manufacturing the connector having the configuration of [6], a joining portion between the electric wire connection portion and a conductor is pressed and expanded in the gap provided between the front end surface of the projection portion in the protruding direction and the bottom surface of the recessed portion, and the protruding piece is formed. Therefore, since it is not necessary to separately form a protruding piece on the terminal, the terminal can be manufactured at a low cost.

What is claimed is:

1. A connector comprising:

a terminal;

an electric wire connected to the terminal; and a housing having a tubular portion that accommodates and holds the terminal and the electric wire therein, wherein an electric wire connection portion and a terminal connection portion are provided on both end sides of the terminal, the electric wire connection portion is connected to the electric wire, the terminal connection portion is configured to be connected to a mating terminal, the electric wire connection portion is formed in a solid cylindrical shape, a joining portion between an end surface of the electric wire connection portion and an end surface of the electric wire includes a protruding piece protruding in a radial direction of the electric wire connection portion, a first retaining piece and a second retaining piece configured to be locked to the protruding piece are provided on an inner peripheral surface of the tubular portion of the housing, and the second retaining piece is disposed at a position shifted from the first retaining piece in both a circumferential direction and an axial direction of the tubular portion.

2. The connector according to claim 1, wherein the terminal and the electric wire are held in the housing in a state where the protruding piece is sandwiched between the first retaining piece and the second retaining piece in the axial direction.

3. The connector according to claim 1, wherein the protruding piece is an enlarged portion formed when the end surface of the electric wire connection portion and the end surface of the electric wire are joined by thermal pressure welding.

4. The connector according to claim 1, wherein a rotation stop portion, which restricts rotational movement of the protruding piece in the circumferential direction, is provided on the inner peripheral surface of the tubular portion of the housing.

5. A method for manufacturing the connector according to claim 1, comprising:

inserting the terminal connection portion of the terminal into the tubular portion of the housing to abut the protruding piece against the first retaining piece; and rotating the terminal in the tubular portion in the circumferential direction to position the protruding piece between the first retaining piece and the second retaining piece.

6. The method according to claim 5, wherein the joining portion is formed by disposing the electric wire connection portion and the electric wire between a first electrode and a second electrode capable of being fitted to the first electrode in a state where the end surface of the electric wire connection portion and the end surface of the electric wire abut on each other, and by thermally pressure-welding the end surface of the electric wire connection portion and the end surface of the electric wire, the first electrode includes a first electrode body covering a periphery of the electric wire connection portion, and a projection portion protruding from the first electrode body toward the second electrode, the second electrode includes a second electrode body covering an end portion of the electric wire, and a recessed portion provided in the second electrode body and capable of accommodating the projection portion, in a state where the first electrode body and the second electrode body abut on each other, a gap is provided between a front end surface of the projection portion in a protruding direction of the projection portion and a bottom surface of the recessed portion, and the protruding piece is formed by pressing and expanding an end portion of the electric wire connection portion and the end portion of the electric wire into the gap with the thermal pressure welding.

* * * * *